(12) United States Patent
Nakagawa et al.

(10) Patent No.: US 10,003,475 B2
(45) Date of Patent: Jun. 19, 2018

(54) COMMUNICATION MANAGEMENT SYSTEM, COMMUNICATION MANAGEMENT METHOD, AND MANAGEMENT APPARATUS

(71) Applicant: FUJITSU LIMITED, Kawasaki-shi, Kanagawa (JP)

(72) Inventors: Itaru Nakagawa, Kawasaki (JP); Kazuo Sasaki, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 195 days.

(21) Appl. No.: 15/201,970

(22) Filed: Jul. 5, 2016

(65) Prior Publication Data
US 2016/0315789 A1 Oct. 27, 2016

Related U.S. Application Data

(63) Continuation of application No. PCT/JP2014/050038, filed on Jan. 6, 2014.

(51) Int. Cl.
*H04L 1/00* (2006.01)
*H04L 12/64* (2006.01)
(Continued)

(52) U.S. Cl.
CPC .......... *H04L 12/6418* (2013.01); *H04B 3/36* (2013.01); *H04L 45/745* (2013.01); *H04L 61/1511* (2013.01)

(58) Field of Classification Search
CPC ............. H04L 12/6418; H04L 61/1511; H04L 45/745; H04B 3/36
See application file for complete search history.

(56) References Cited

U.S. PATENT DOCUMENTS 8,751,613 B1* 6/2014 Medved ............... H04L 45/00
370/229
2006/0206608 A1* 9/2006 Naito ................ H04L 29/12066
709/224
(Continued)

FOREIGN PATENT DOCUMENTS

JP 2002-009971 1/2002
JP 2006-020031 1/2006
(Continued)

OTHER PUBLICATIONS

"The seamless roaming system among heterogeneous networks supported by agents", Iizuka et al., Fujitsu Laboratories, Mar. 7, 2003.
(Continued)

*Primary Examiner* — Clemence Han
(74) *Attorney, Agent, or Firm* — Staas & Halsey LLP

(57) ABSTRACT

A communication management system includes a GW and a server. The GW relays communication with a destination site via a first NW when an FQDN included in a communication request exists in a list. The server supplies the list to the GW. The server includes an aggregation unit that obtains a record including a communication FQDN, a detection GW, and accompanying information, aggregates the amount of access for each of the FQDNs based on the obtained record, and generates an attribute rank table on attribute of interest and a communication rank table for all the GWs. The server includes an extraction unit that extracts FQDNs highly ranked in the percentage of the number of accesses from the communication rank table and the attribute rank table based on a predetermined extraction ratio, as the list for the GWs corresponding to the attribute of interest, and distributes the list to the GW.

7 Claims, 18 Drawing Sheets

(51) Int. Cl.
*H04B 3/36* (2006.01)
*H04L 12/741* (2013.01)
*H04L 29/12* (2006.01)

(56) References Cited

U.S. PATENT DOCUMENTS

| | | | | |
|---|---|---|---|---|
| 2011/0055312 | A1* | 3/2011 | Purdy, Sr. | H04L 29/12066 709/203 |
| 2011/0271005 | A1* | 11/2011 | Bharrat | H04L 61/1511 709/232 |
| 2012/0014249 | A1* | 1/2012 | Narendran | G06Q 30/06 370/231 |
| 2012/0036179 | A1* | 2/2012 | Hegde | H04L 61/1511 709/203 |
| 2013/0094395 | A1* | 4/2013 | Lopez | H04L 29/12066 370/254 |
| 2014/0164584 | A1* | 6/2014 | Joe | H04L 12/5689 709/223 |
| 2014/0215628 | A1* | 7/2014 | Yan | H04L 61/1511 726/25 |
| 2016/0021001 | A1* | 1/2016 | Nakagawa | H04L 12/6418 370/389 |
| 2016/0065535 | A1* | 3/2016 | O'Leary | H04L 63/1441 707/728 |

FOREIGN PATENT DOCUMENTS

| | | |
|---|---|---|
| JP | 2008-504792 | 2/2008 |
| JP | 2009-171009 | 7/2009 |
| WO | 2006/004784 | 1/2006 |
| WO | 2006/004930 | 1/2006 |

OTHER PUBLICATIONS

International Search Report and Written Opinion for PCT Application No. PCT/JP2014/050038, dated Apr. 1, 2014.

* cited by examiner

| RANK | COMMON | | | PLACE: JP | | | PLACE:US | | |
|---|---|---|---|---|---|---|---|---|---|
| | FQDN | TIMES | PER-CENTAGE | FQDN | TIMES | PER-CENTAGE | FQDN | TIMES | PER-CENTAGE |
| 1 | 1 | 1105 | 17.45 | 15 | 500 | 14.06 | 1 | 700 | 25.20 |
| 2 | 2 | 815 | 12.87 | 16 | 458 | 12.88 | 2 | 525 | 18.90 |
| 3 | 6 | 513 | 8.10 | 1 | 405 | 11.39 | 3 | 394 | 14.18 |
| 4 | 15 | 512 | 8.08 | 13 | 365 | 10.26 | 4 | 295 | 10.62 |
| 5 | 3 | 501 | 7.91 | 12 | 356 | 10.01 | 5 | 221 | 7.96 |
| 6 | 16 | 467 | 7.37 | 6 | 347 | 9.76 | 6 | 166 | 5.98 |
| 7 | 13 | 387 | 6.11 | 14 | 318 | 8.94 | 7 | 125 | 4.50 |
| 8 | 12 | 386 | 6.09 | 17 | 300 | 8.44 | 8 | 93 | 3.35 |
| 9 | 4 | 350 | 5.53 | 2 | 290 | 8.16 | 9 | 70 | 2.52 |
| 10 | 14 | 335 | 5.29 | 3 | 107 | 3.01 | 10 | 53 | 1.91 |
| 11 | 17 | 307 | 4.85 | 4 | 55 | 1.55 | 11 | 39 | 1.40 |
| 12 | 5 | 249 | 3.93 | 5 | 28 | 0.79 | 12 | 30 | 1.08 |
| 13 | 7 | 139 | 2.19 | 7 | 14 | 0.39 | 13 | 22 | 0.79 |
| 14 | 8 | 96 | 1.52 | 11 | 7 | 0.20 | 14 | 17 | 0.61 |
| 15 | 9 | 71 | 1.12 | 8 | 3 | 0.08 | 15 | 12 | 0.43 |
| 16 | 10 | 55 | 0.87 | 10 | 2 | 0.06 | 16 | 9 | 0.32 |
| 17 | 11 | 46 | 0.73 | 9 | 1 | 0.03 | 17 | 7 | 0.25 |
| TOTAL | - | 6334 | 100 | - | 3556 | 100 | - | 2778 | 100 |

FIG.6

| RANK | COMMON | | | PLACE: JP | | | PLACE:US | | |
|---|---|---|---|---|---|---|---|---|---|
| | FQDN | TIMES | PER-CENTAGE | FQDN | TIMES | PER-CENTAGE | FQDN | TIMES | PER-CENTAGE |
| 1 | 1 | 1105 | 17.45 | 15 | 500 | 14.06 | 1 | 700 | 25.20 |
| 2 | 2 | 815 | 12.87 | 16 | 458 | 12.88 | 2 | 525 | 18.90 |
| 3 | 6 | 513 | 8.10 | 1 | 405 | 11.39 | 3 | 394 | 14.18 |
| 4 | 15 | 512 | 8.08 | 13 | 365 | 10.26 | 4 | 295 | 10.62 |
| 5 | 3 | 501 | 7.91 | 12 | 356 | 10.01 | 5 | 221 | 7.96 |
| 6 | 16 | 467 | 7.37 | 6 | 347 | 9.76 | 6 | 166 | 5.98 |
| 7 | 13 | 387 | 6.11 | 14 | 318 | 8.94 | 7 | 125 | 4.50 |
| 8 | 12 | 386 | 6.09 | 17 | 300 | 8.44 | 8 | 93 | 3.35 |
| 9 | 4 | 350 | 5.53 | 2 | 290 | 8.16 | 9 | 70 | 2.52 |
| 10 | 14 | 335 | 5.29 | 3 | 107 | 3.01 | 10 | 53 | 1.91 |
| 11 | 17 | 307 | 4.85 | 4 | 55 | 1.55 | 11 | 39 | 1.40 |
| 12 | 5 | 249 | 3.93 | 5 | 28 | 0.79 | 12 | 30 | 1.08 |
| 13 | 7 | 139 | 2.19 | 7 | 14 | 0.39 | 13 | 22 | 0.79 |
| 14 | 8 | 96 | 1.52 | 11 | 7 | 0.20 | 14 | 17 | 0.61 |
| 15 | 9 | 71 | 1.12 | 8 | 3 | 0.08 | 15 | 12 | 0.43 |
| 16 | 10 | 55 | 0.87 | 10 | 2 | 0.06 | 16 | 9 | 0.32 |
| 17 | 11 | 46 | 0.73 | 9 | 1 | 0.03 | 17 | 7 | 0.25 |
| TOTAL | - | 6334 | 100 | - | 3556 | 100 | - | 2778 | 100 |

FIG.12

| RANK | COMMON 43A | | | PLACE: JP 43B | | | PLACE:US 43B | | | 43X |
|---|---|---|---|---|---|---|---|---|---|---|
| | FQDN 431A | TIMES 432A | PER-CENTAGE 433A | FQDN 431B | TIMES 432B | PER-CENTAGE 433B | FQDN 431B | TIMES 432B | PER-CENTAGE 433B | |
| 1 | 1 | 1105 | 17.45 | 15 | 500 | 14.06 | 1 | 700 | 25.20 | |
| 2 | 2 | 815 | 12.87 | 16 | 458 | 12.88 | 2 | 525 | 18.90 | |
| 3 | 6 | 513 | 8.10 | 1 | 405 | 11.39 | 3 | 394 | 14.18 | |
| 4 | 15 | 512 | 8.08 | 13 | 365 | 10.26 | 4 | 295 | 10.62 | |
| 5 | 3 | 501 | 7.91 | 12 | 356 | 10.01 | 5 | 221 | 7.96 | |
| 6 | 16 | 467 | 7.37 | 6 | 347 | 9.76 | 6 | 166 | 5.98 | |
| 7 | 13 | 387 | 6.11 | 14 | 318 | 8.94 | 7 | 125 | 4.50 | |
| 8 | 12 | 386 | 6.09 | 17 | 300 | 8.44 | 8 | 93 | 3.35 | |
| 9 | 4 | 350 | 5.53 | 2 | 290 | 8.16 | 9 | 70 | 2.52 | |
| 10 | 14 | 335 | 5.29 | 3 | 107 | 3.01 | 10 | 53 | 1.91 | |
| 11 | 17 | 307 | 4.85 | 4 | 55 | 1.55 | 11 | 39 | 1.40 | |
| 12 | 5 | 249 | 3.93 | 5 | 28 | 0.79 | 12 | 30 | 1.08 | |
| 13 | 7 | 139 | 2.19 | 7 | 14 | 0.39 | 13 | 22 | 0.79 | |
| 14 | 8 | 96 | 1.52 | 11 | 7 | 0.20 | 14 | 17 | 0.61 | |
| 15 | 9 | 71 | 1.12 | 8 | 3 | 0.08 | 15 | 12 | 0.43 | |
| 16 | 10 | 55 | 0.87 | 10 | 2 | 0.06 | 16 | 9 | 0.32 | |
| 17 | 11 | 46 | 0.73 | 9 | 1 | 0.03 | 17 | 7 | 0.25 | |
| TOTAL | - | 6334 | 100 | - | 3556 | 100 | - | 2778 | 100 | |

FIG.16
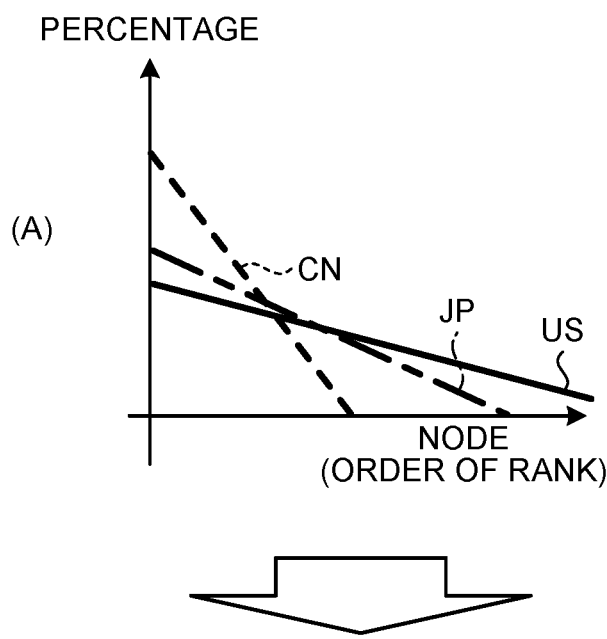
(A)
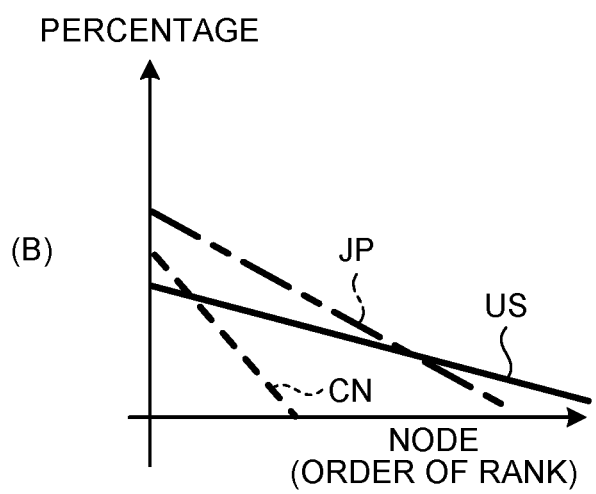
(B)

ND MANAGEMENT APPARATUS

COMMUNICATION MANAGEMENT SYSTEM, COMMUNICATION MANAGEMENT METHOD, AND MANAGEMENT APPARATUS

CROSS-REFERENCE TO RELATED APPLICATION

This application is a continuation of International Application No. PCT/JP2014/050038, filed on Jan. 6, 2014, the entire contents of which are incorporated herein by reference.

FIELD

The embodiments discussed herein are related to a communication management system, a communication management method, and a management apparatus.

BACKGROUND

In recent years, along with diversification of services, there is a known technique used by a relay apparatus such as a mobile router for relaying communication between a terminal apparatus and a destination site by switching between a private network and a public network. The relay apparatus relays communication between the terminal apparatus and the destination site using a private network in view of security. This might increase communication load in the private network as a result.

Patent Literature 1: Japanese National Publication of International Patent Application No. 2008-504792
Patent Literature 2: Japanese Laid-open Patent Publication No. 2006-20031

To cope with this, the relay apparatus reduces processing load on a server on a private network side, by switching, for example, to the public network when the destination site has high reliability and to the private network when the destination site has low reliability. At this time, the relay apparatus has a list, a fully qualified domain name (FQDN) of a highly reliable destination site. In a case where an FQDN of the destination site included in a communication request from a terminal apparatus exists on the list, the relay apparatus relays communication between the terminal apparatus and the destination site using the public network instead of the private network.

On the relay apparatus, however, along with the increased number of sites to be used, the number of entries on the list also increases. This would increase processing load needed for list. As a result, control of processing might become difficult with a low-capability relay apparatus. In a case where determination of reliability of the destination site is executed on the management server side, increased number of terminals would cause high load, leading to an increase in cost to reduce the load on the server in the private network.

SUMMARY

According to an aspect of the embodiments, a communication management system includes a relay apparatus and a management apparatus. The relay apparatus is configured to relay communication with a communication destination party via a specific route in a case where the communication destination party included in a communication request exists on a list. The management apparatus is configured to supply the list to the relay apparatus. The management apparatus includes an aggregation unit and an extraction unit. The aggregation unit is configured to obtain a communication history including the communication destination party in the communication, identification information and an attribute of the relay apparatus, aggregate the amount of access for each of the communication destination parties based on the obtained communication history, and generate an attribute-based rank table on the attribute of interest and a communication rank table related to all the relay apparatuses. The extraction unit is configured to extract, based on a predetermined extraction ratio indicating a number of extracting the communication destination parties from each of the communication rank table and the attribute-based rank table on the attribute of interest, a predetermined number of communication destination parties highly ranked in the amount of access from each of the communication rank table and the attribute-based rank table, as the list for the relay apparatuses corresponding to the attribute of interest, and supply the list to the relay apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an exemplary method of extracting FQDNs in the first exemplary embodiment;
FIG. 12 is a diagram illustrating an exemplary method of extracting FQDNs in a second exemplary embodiment;
FIG. 16 is a diagram illustrating exemplary correction of percentages on an individual rank table.

DESCRIPTION OF EMBODIMENTS

Preferred embodiments of the present invention will be explained with reference to accompanying drawings. The present disclosed technique is not limited to the present exemplary embodiments.

[a] First Exemplary Embodiment

Figure 1:
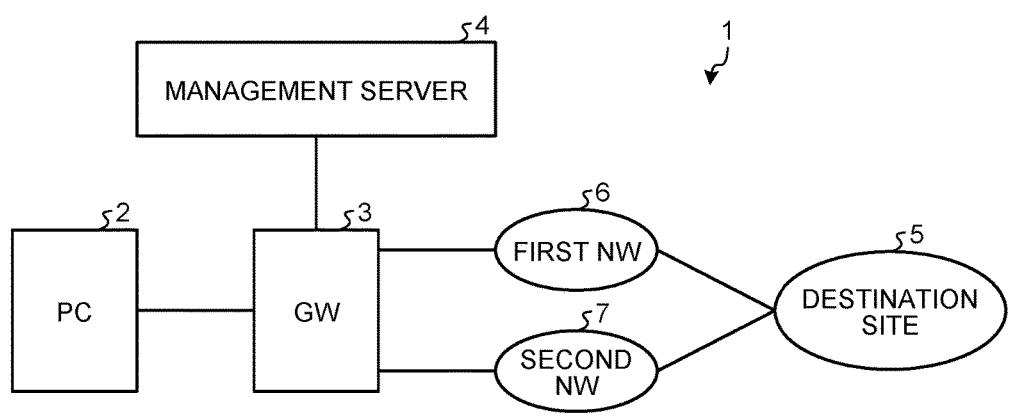
FIG. 1 is a block diagram illustrating an exemplary communication management system in a first exemplary embodiment.

FIG. 1 is a block diagram illustrating an exemplary communication management system 1 according to a first exemplary embodiment. The communication management system 1 illustrated in FIG. 1 includes a personal computer (PC) 2, a gateway (GW) 3, a management server 4, a destination site 5, a first network (NW) 6, and a second NW 7. An exemplary PC 2 is a terminal apparatus of a user. The GW 3 is a relay apparatus that relays communication from the PC 2 to the destination site 5 via the first NW 6 and the second NW 7. Examples of the GW 3 include a mobile router, and a smartphone with a tethering capability. An exemplary first NW 6 is the Internet. An exemplary second NW 7 is a virtual private network (VPN). As described below, the management server 4 is provided for indicating a relaying method to each of the GWs 3, and thus, may be located anywhere, for example, on the Internet, or within the private network, as long as it can communicate with each of the GWs 3.

Figure 2:
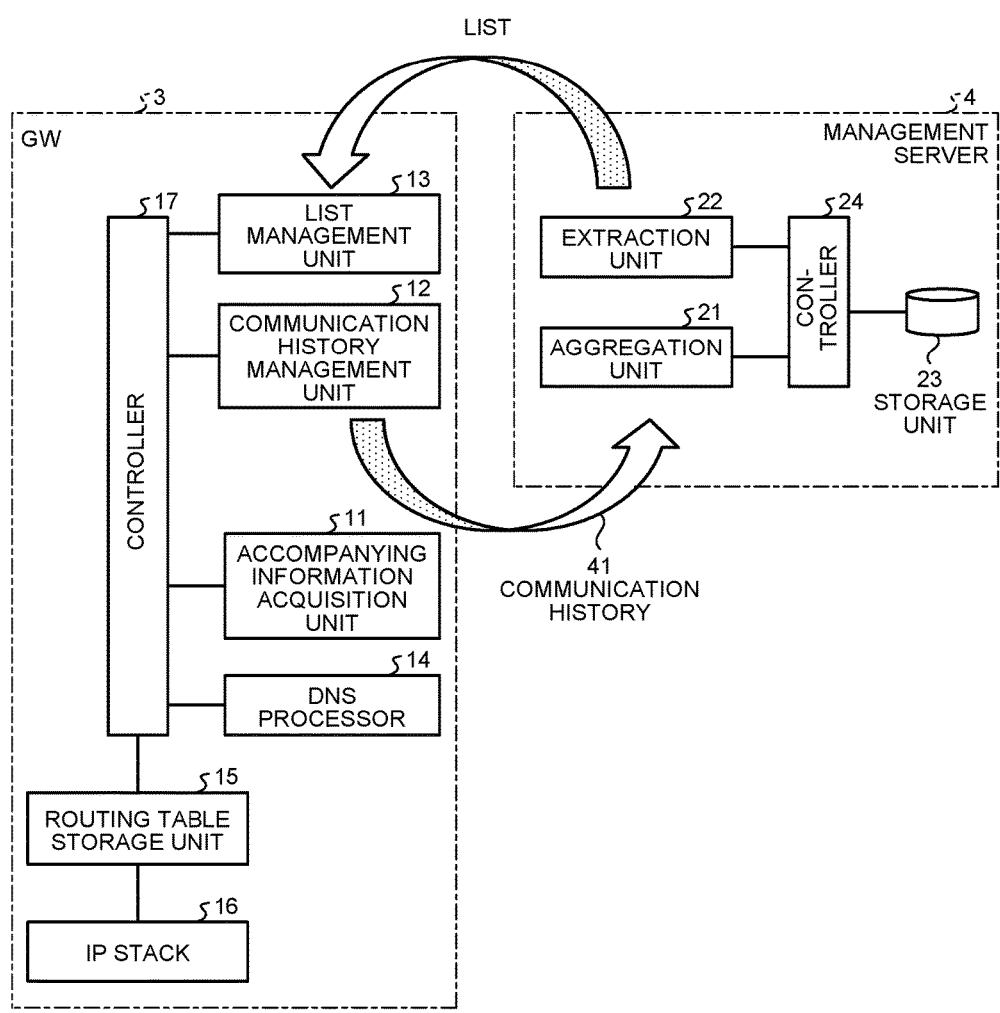
FIG. 2 is a block diagram illustrating an exemplary GW and a management server.

FIG. 2 is a block diagram illustrating an exemplary GW 3 and management server 4. The GW 3 illustrated in FIG. 2 includes an accompanying information acquisition unit 11, a communication history management unit 12, a list management unit 13, a domain name system (DNS) processor 14, a routing table storage unit 15, an IP stack 16, and a controller 17. The accompanying information acquisition unit 11 obtains an attribute of the GW 3, for example, accompanying information including a place of use of the GW 3. The communication history management unit 12 stores and manages a communication history including accompanying information such as an FQDN and a place of use of the destination site 5. The list management unit 13 stores and manages, as a list, the FQDN of the destination site 5 for which direct communication from the PC 2 to the first NW 6 is permitted.

The DNS processor 14 is a processor that inquires the FQDN of the destination site 5 to a DNS server (not illustrated) in response to a DNS inquiry from the PC 2, and then, obtains an IP address corresponding to the FQDN of the destination site 5 from the DNS server, as a DNS response. Moreover, the DNS processor 14 notifies the FQDN and an IP address contained in the DNS response to the controller 17, and thereafter, transfers the received DNS response to the PC 2. With reference to stored items in the routing table storage unit 15, the IP stack 16 transfers received data to the first NW 6 or the second NW 7, according to the stored items.

The controller 17 controls the whole of the GW 3. The controller 17 obtains the FQDN of the destination site 5, for example, by using the DNS response to the DNS inquiry, received from the DNS processor 14 and determines whether the obtained FQDN is included in the list management unit 13. The controller 17 obtains a determination result of whether the FQDN is included in the list management unit 13, and thereafter, updates the routing table storage unit 15. Furthermore, when the routing table storage unit 15 is updated to execute routing control, the controller 17 stores a communication history 41 of the destination site 5 in the communication via the first NW 6 or the second NW 7, in the communication history management unit 12. The controller 17 notifies the communication history 41 to the management server 4 with a predetermined interval.

The management server 4 includes a aggregation unit 21, an extraction unit 22, a storage unit 23, and a controller 24. The aggregation unit 21 collects the communication history 41, namely, the notified items from each of the GWs 3 within a aggregation target period, and obtains the communication history 41 exemplified in FIG. 3(A) described below. Moreover, the aggregation unit 21 aggregates the collected communication histories 41 with a method described below and generates two tables as described below. One is a viewpoint-based rank table 43 related to the amount of access to each of the destination sites 5 exemplified in FIG. 3(D). The other is a GW-attribute correspondence table 44 exemplified in FIG. 3(C). As described below, the extraction unit 22 extracts FQDNs highly ranked in the amount of access from each of the viewpoint-based rank table 43, and distributes a corresponding list to a corresponding GW 3 using the GW-attribute correspondence table 44. The storage unit 23 stores, for example, an FQDN of the destination site 5 collected from the GW 3, the communication history 41 including accompanying information and a detection GW to identify GW 3, and the viewpoint-based rank table generated by the extraction unit 22.

The controller 24 controls the whole of the management server 4. For example, the controller 24 collects a communication history 41 from each of the GWs 3 with a predetermined interval, and generates a viewpoint-based rank table 43 and a GW-attribute correspondence table 44 using the aggregation unit 21. The controller 24 obtains a result of determination of whether distribution is needed for the list extracted by the extraction unit 22, and then, distributes a generated list to a corresponding GW 3. When the extraction unit 22 extracts FQDNs highly ranked on each of the viewpoint-based rank tables 43, extraction is performed, for example, with a predetermined fixed ratio. Since FQDNs are extracted from higher ranks on each of the viewpoint-based rank tables 43 for commonality and for attribute, FQDNs of a site having generally a great amount of access and a site that exists in great amount within a specific group with attribute would be likely to be extracted. The number of FQDN entries on the list depends on capability or specification of the GW 3.

Determination of whether an FQDN is to be added to the list depends on the rank of the FQDN on the viewpoint-based rank table 43. Accordingly, the management server 4 extracts FQDNs to be added to the list from both the commonality and the attribute.

Figure 3:
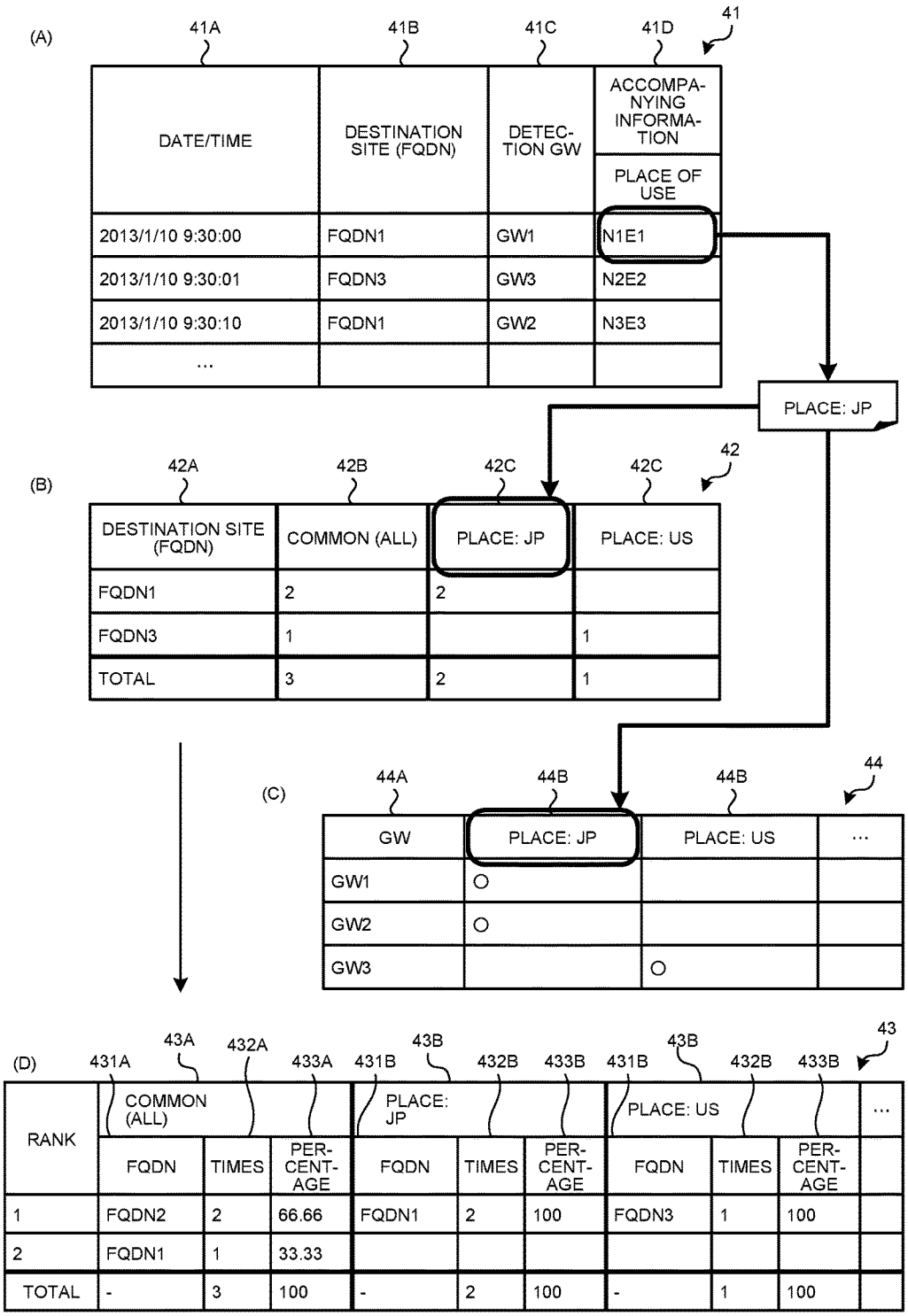
FIG. 3 is a diagram illustrating an exemplary method of generating a viewpoint-based rank table.

A method of generating the viewpoint-based rank table 43 to be used at extraction of FQDNs to be added to the list will be described. FIG. 3 is a diagram illustrating an exemplary method of generating the viewpoint-based rank table 43. The aggregation unit 21 of the management server 4 collects from each of the GWs 3 a communication history 41 illustrated in FIG. 3(A). The communication history 41 associates access date and time 41A, an FQDN 41B for identifying the destination site 5, a detection GW 41C, and accompanying information (place of use) 41D, with each other. The accompanying information 41D is information for performing grouping based on the attribute of GW 3, for example, the place of use of GW 3 such as JP, US, or the like. The aggregation unit 21 aggregates the number of accesses for each of FQDNs, for viewpoint-based commonality or attribute as illustrated in FIG. 3(B) based on the communication history 41, and generates a viewpoint-based aggregation table 42. The viewpoint-based aggregation table 42 manages, for each of FQDNs 42A of the destination site 5, the number of accesses 42B for commonality in association with the number of accesses 42C for attribute (place of use: JP or US).

The aggregation unit 21 generates a GW-attribute correspondence table 44 illustrated in FIG. 3(C) corresponding to the detection GW 41C and accompanying information 41D on the communication history 41 illustrated in FIG. 3(A), collected from the GW 3. The GW-attribute correspondence table 44 manages accompanying information (place of use) 44B for each of GW 44A. The aggregation unit 21 calculates a percentage of the number of accesses 42B (42C) of the FQDN 42A on the viewpoint-based aggregation table 42, and generates as illustrated in FIG. 3(D), a viewpoint-based rank table 43 for commonality and for attribute, based on the percentage of the number of accesses 42B (42C). The viewpoint-based rank table 43 manages ranks while associating a commonality rank table 43A with a attribute rank table 43B. The commonality rank table 43A is an FQDN rank table in which ranking is determined by the amount of access of each of FQDNs 431A (percentage 433A of the number of accesses 432A). The attribute rank table 43B is an FQDN rank table for attribute (place of use: JP or US) in which ranking is determined by the amount of access (percentage 433B of the number of accesses 432B) of an FQDN 431B grouped by attribute.

The aggregation unit 21 generates the viewpoint-based rank table 43 illustrated in FIG. 3(D) by adding the number of accesses to a column of the commonality rank table 43A and to a column of the corresponding attribute rank table 43B, for each of FQDNs of the destination site 5 of the communication history 41. The exemplary viewpoints in viewpoint-based rank table 43 in FIG. 3(D) include three types, namely, commonality (whole), JP, and US.

Figure 4:
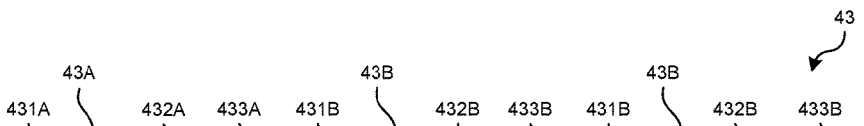
FIG. 4 is a diagram illustrating an exemplary viewpoint-based rank table.

The percentage 433A (433B) of each of the viewpoint-based rank tables 43 indicates the percentage of the number of accesses of an FQDN for each of the viewpoints, to the total number of accesses when the total percentage of the total number of accesses per viewpoint is assumed to be 100%. For example, in a case where FQDN "1" illustrated in FIG. 3(D) is an FQDN of interest, and in view of commonality (whole), the percentage 433A would be 33.33%. The percentage 433B would be 100% in view of "JP". The percentage 433A (433B) of the amount of access on the viewpoint-based rank table 43 is higher rank ≥ lower rank, namely, the value gradually becomes smaller in a lower rank. FIG. 4 is a diagram illustrating an exemplary viewpoint-based rank table 43. As aggregation of the communication history 41 progresses, the aggregation unit 21 starts to generate the viewpoint-based rank table 43 as illustrated in FIG. 4.

Figure 5:
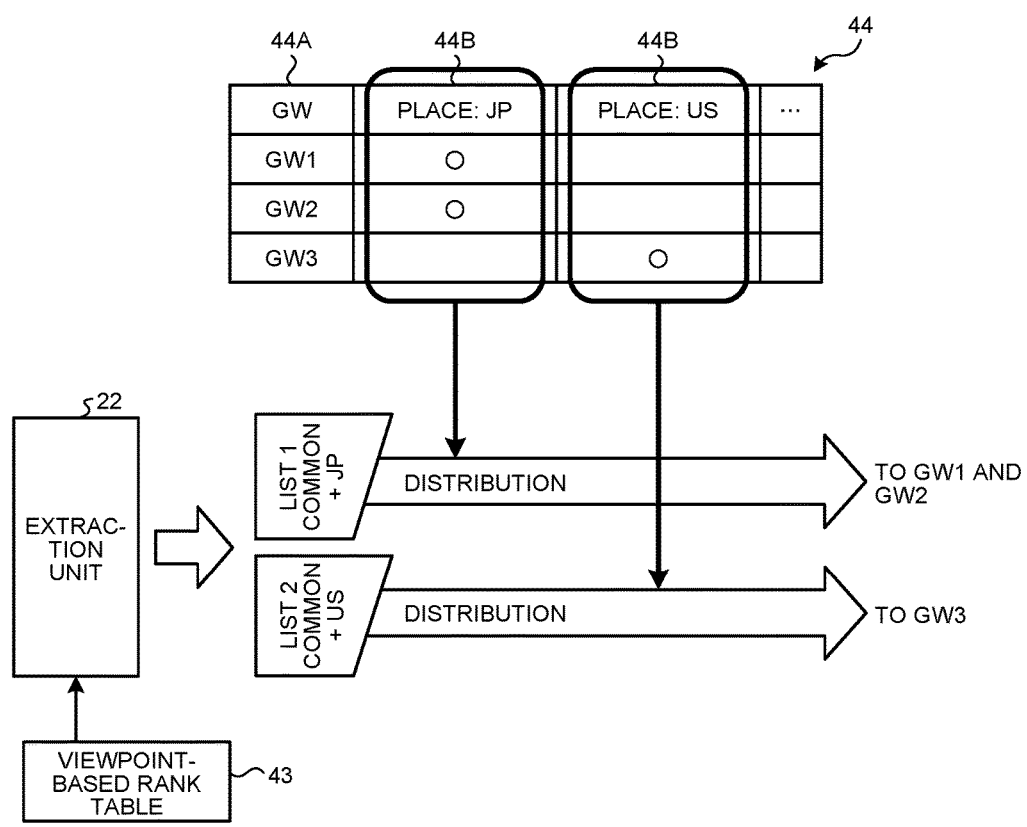
FIG. 5 is a diagram illustrating an exemplary list distribution method.

Next, a method of distributing an FQDN list extracted by the extraction unit 22, to the GW 3, will be described. FIG. 5 is a diagram illustrating an exemplary list distribution method. The extraction unit 22 refers to the GW-attribute correspondence table 44 generated by the aggregation unit 21 and then, distributes a list including highly ranked FQDNs extracted from the viewpoint-based rank table 43, to the GW 3 corresponding to the place of use 44B. The aggregation unit 21 extracts a plurality types of attribute with a same GW 3 in a case, for example, where movement occurs between JP and US within a aggregation target period. At this time, the extraction unit 22 refers to the GW-attribute correspondence table 44 and then, distributes a list to the GW 3 grouped by attribute corresponding to a latest value among a plurality of attribute values extracted from a corresponding GW 3. Although the extraction unit 22 distributes the list to the GW 3 with attribute corresponding to the latest value, it is allowable, however, to distribute the list to the GW 3 grouped by attribute corresponding to the most frequent value, namely, the value with the highest frequency, among the plurality of attribute values.

Hereinabove, the extraction unit 22 obtains the list of FQDNs and then, distributes the obtained list simultaneously to the GW 3 grouped by attribute. Alternatively, however, it is also allowable to configure such that the extraction unit 22 distributes the list in response to a request from each of the GWs 3, for example, a request at startup, or a request at detection of a change in accompanying information of attribute. The time of detection of a change in accompanying information of attribute corresponds, for example, to a case where the place of use 44B has changed from US to JP. It is also allowable to configure such that the extraction unit 22, when it receives accompanying information from each of the GW 3, specifies a list obtained by attribute of accompanying information and distributes the specified list to a corresponding GW 3 of the accompanying information.

Next, a method of extracting FQDNs to be added to the list, from the viewpoint-based rank table 43, will be described. FIG. 6 is a diagram illustrating an exemplary method of extracting FQDNs in the first exemplary embodiment. The extraction unit 22 sequentially extracts FQDNs of the number of entries, from the FQDNs highly ranked in the percentages 433A and 433B from the viewpoint-based rank table 43, with a fixed extraction ratio. For example, the extraction unit 22 separately extracts FQDNs with the percentage 433A (433B) from the commonality rank table 43A and from the attribute rank table 43B, with an extraction ratio of 2:1. Firstly, in an example in FIG. 6, the extraction unit 22 extracts FQDNs "1" and "2" from the commonality rank table 43A, and extracts FQDN "15" from the rank table 43B for JP. Next, the extraction unit 22 extracts FQDNs "6" and "15" from the commonality rank table 43A, and extracts FQDN "16" from the rank table 43B for JP. In addition, the extraction unit 22 extracts FQDNs "3" and "16" from the commonality rank table 43A, and extracts FQDN "1" from the rank table 43B for JP. When the number of extracted FQDNs reaches the upper limit of the number of entries for the list, the extraction unit 22 stops FQDN extraction processing. The extraction unit 22, however, stops FQDN extraction processing when the load on the second NW 7-side server decreases to a load target value even when the number of extracted FQDNs has not reached the upper limit of the number of entries. This processing aims to reduce the load needed for extraction processing on a GW 3 side.

Figure 7:
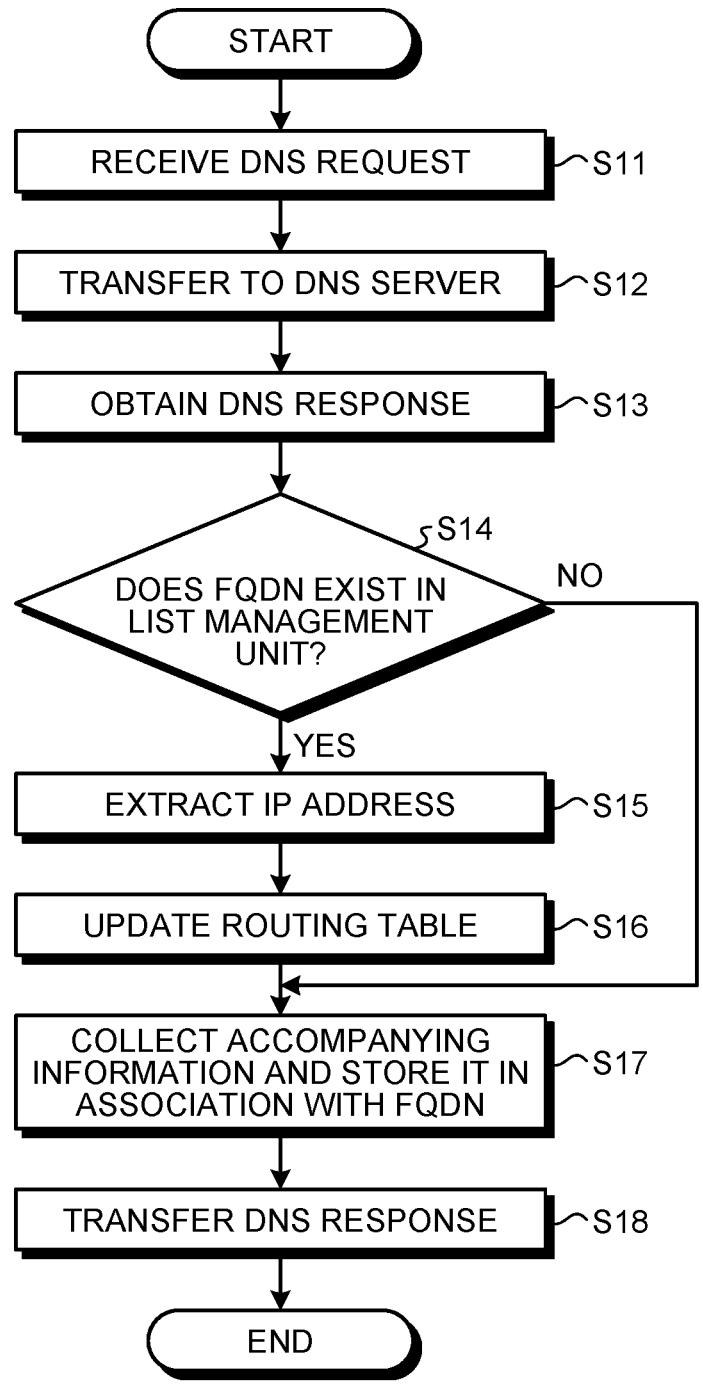
FIG. 7 is a flowchart illustrating exemplary processing operation on a GW side.

FIG. 7 is a flowchart illustrating exemplary processing operation on the GW 3 side. In FIG. 7, when the DNS processor 14 in the GW 3 receives a DNS request of the destination site 5 from the PC 2 (step S11), the DNS processor 14 transfers the DNS request to the DNS server (step S12). When the list management unit 13 in the GW 3 obtains a DNS response corresponding to the DNS request, from the DNS server (step S13), the list management unit 13 determines whether the FQDN of the destination site 5, in the DNS response, exists in the list management unit 13 (step S14).

In a case where the FQDN of the destination site 5 exists in the list management unit 13 (step S14: Yes), the controller 17 in the GW 3 extracts an IP address of the destination site 5 (step S15). The controller 17 stores the extracted IP address of the destination site 5 onto the routing table storage unit 15 for update (step S16). The accompanying information acquisition unit 11 in the GW 3 collects accompanying information, and stores the accompanying information in the communication history management unit 12 in association with the FQDN of the destination site 5 (step S17). The DNS processor 14 in the GW 3 transfers the DNS response to the PC 2 (step S18), and finishes processing operation illustrated in FIG. 7.

In a case where the FQDN of the destination site 5 in the DNS response does not exist in the list management unit 13 (step S14: No), the controller 17 moves on to step S17 so as to store accompanying information in association with the FQDN, in the communication history management unit 12.

Figure 8:
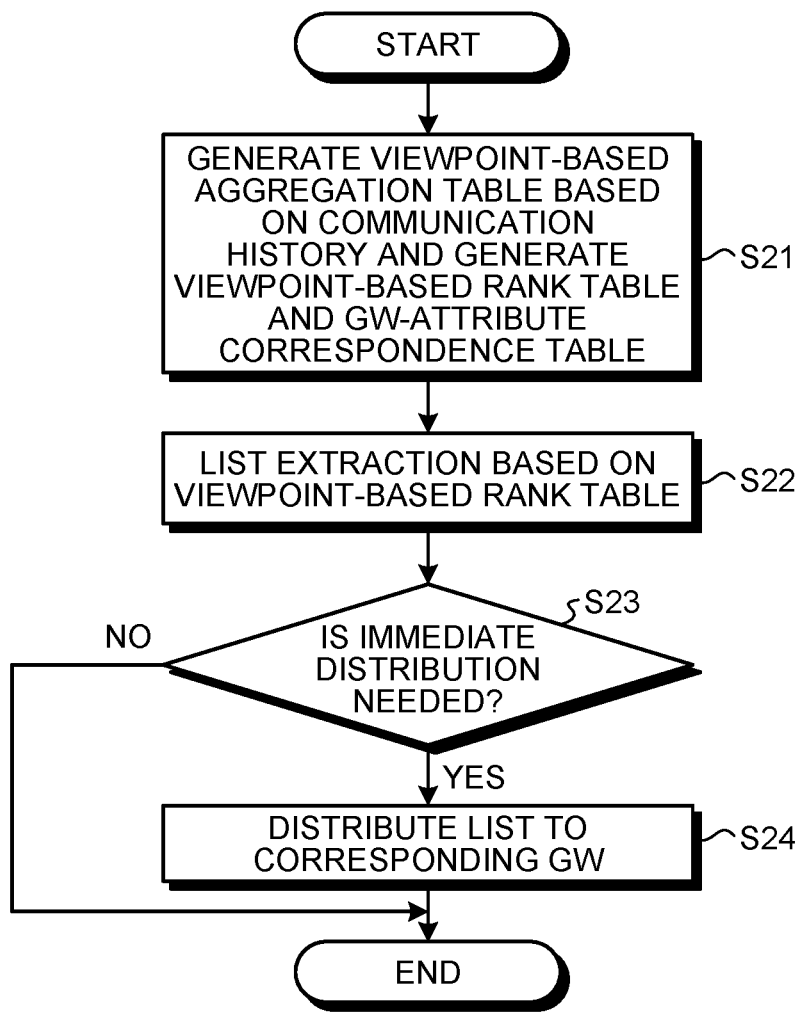
FIG. 8 is a flowchart illustrating exemplary processing operation on the management server side.

FIG. 8 is a flowchart illustrating exemplary processing operation on a management server 4 side. In FIG. 8, the aggregation unit 21 in the management server 4 generates a viewpoint-based aggregation table 42 based on a communication history 41 received from each of the GWs 3 as illustrated in FIG. 3. Then, the aggregation unit 21 generates a GW-attribute correspondence table 44 and a viewpoint-based rank table 43 based on the generated viewpoint-based aggregation table 42 (step S21). Herein, it is assumed that the aggregation unit 21 periodically receives communication histories (including the FQDN of accessed destination, accompanying information, and detection GW) 41, from each of the GWs 3. Herein it is configured such that each of the GWs 3 periodically transmits the communication history 41 to the management server 4. Alternatively, it is allowable to configure such that, for example, the GW 3 transmits the communication history 41 to the management server 4 when a predetermined time arrives or the number of accesses reaches a predetermined number.

The extraction unit 22 in the management server 4 extracts FQDNs for a list based on the viewpoint-based rank table 43 (step S22). The extraction unit 22 determines whether to immediately distribute the list of extracted FQDNs to the GW 3 grouped by the corresponding attribute (step S23). In a case where the extraction unit 22 immediately distributes the list to the corresponding GW 3 (step S23: Yes), the extraction unit 22 refers to the GW-attribute correspondence table 44 and then distributes the list including the extracted FQDNs to the corresponding GW 3 (step S24), and finishes the processing operation illustrated in FIG. 8. In a case where the extraction unit 22 does not immediately distribute the list including the extracted FQDNs to the corresponding GW 3 (step S23: No), the extraction unit 22 finishes the processing operation illustrated in FIG. 8.

Figure 9:
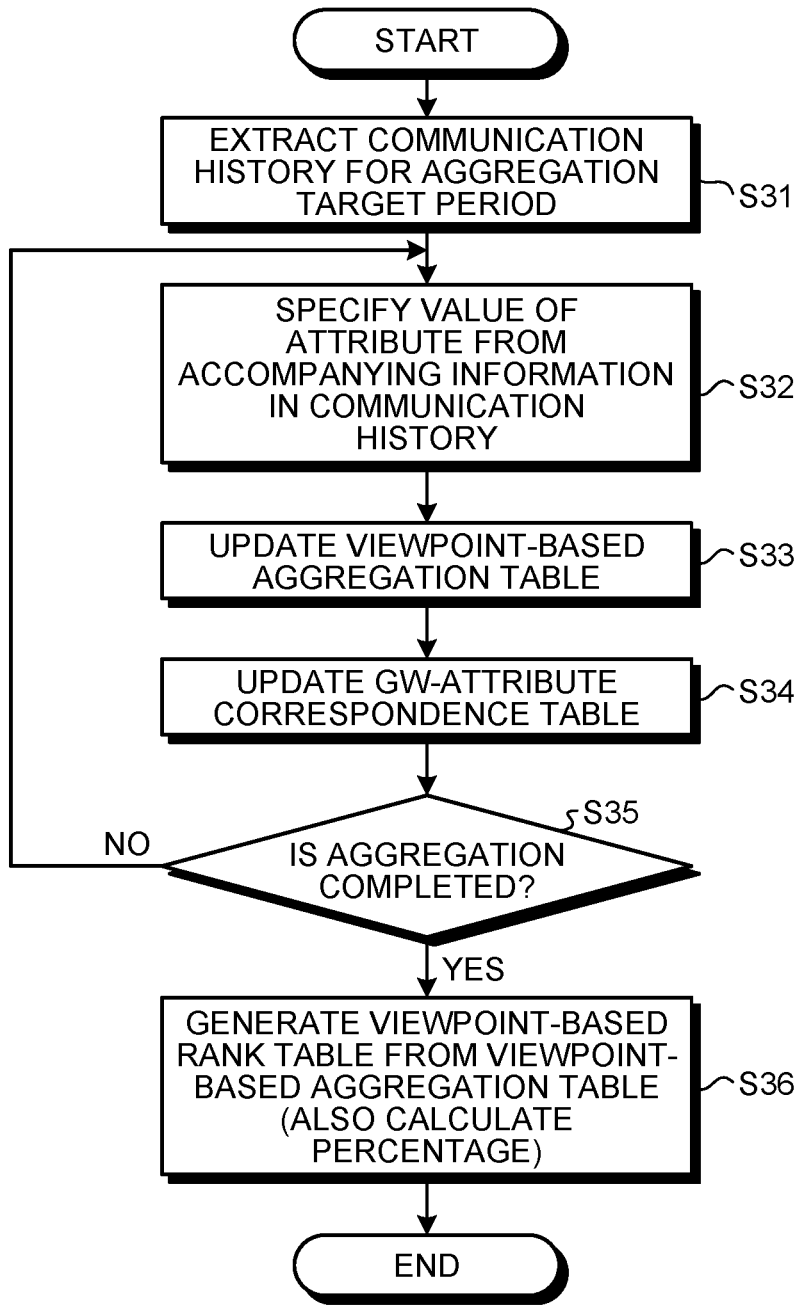
FIG. 9 is a flowchart illustrating exemplary processing operation on the management server side related to generation processing.
Figure 10:
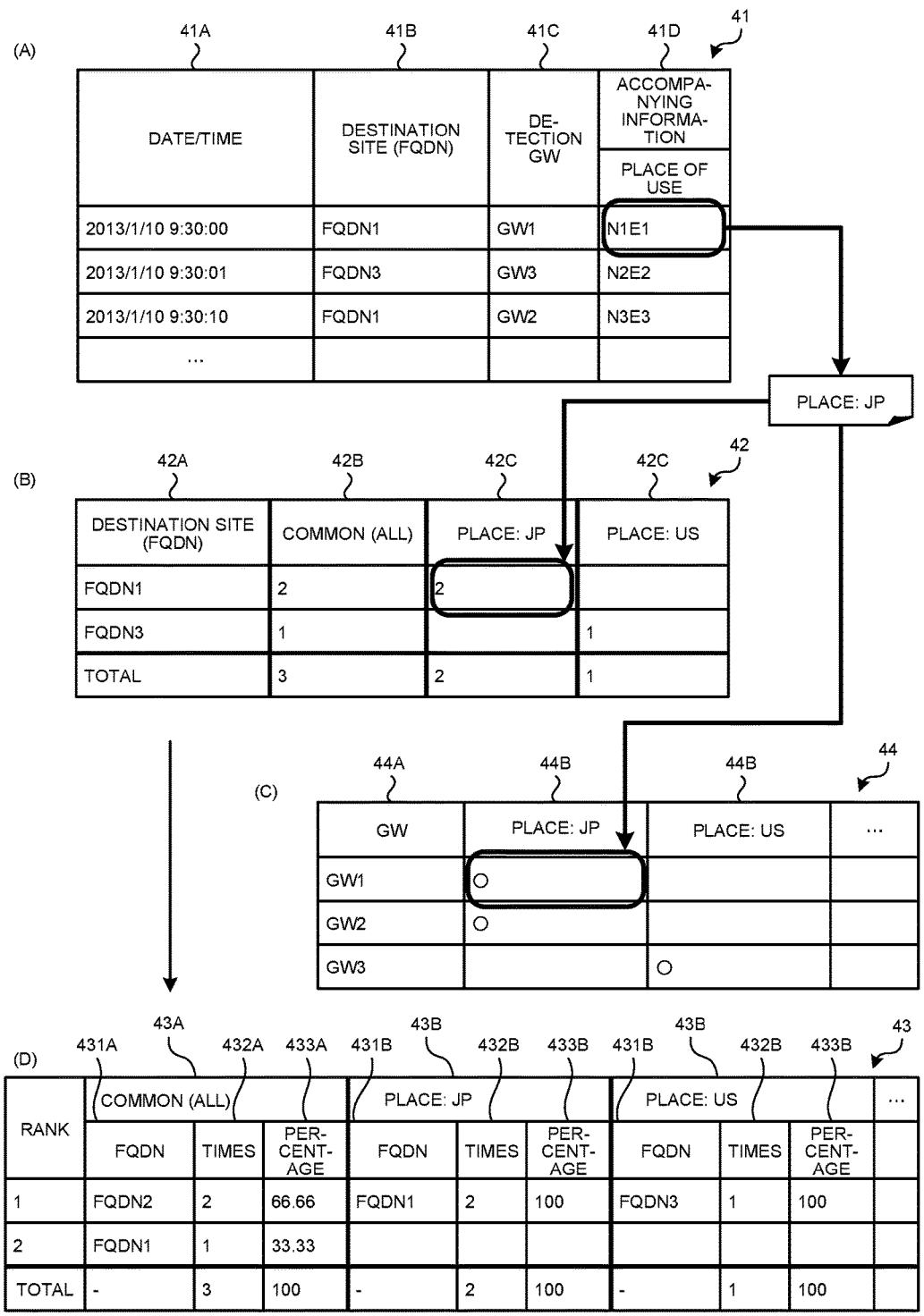
FIG. 10 is a diagram illustrating an exemplary method of generating a viewpoint-based rank table.

Next, processing of generating the viewpoint-based aggregation table 42 and the viewpoint-based rank table 43 on the management server 4 side will be described in detail with reference to FIG. 9 and FIG. 10. FIG. 9 is a flowchart illustrating exemplary processing operation on the management server 4 side related to generation processing. FIG. 10 is a diagram illustrating an exemplary generation method of a viewpoint-based rank table. The aggregation unit 21 in the management server 4 extracts communication history 41 for an aggregation target period from the communication histories 41 received from each of the GWs 3 (step S31). The aggregation unit 21 specifies a value of attribute from the accompanying information on the communication history 41 (step S32). In a case where the accompanying information 41D of the communication history 41 illustrated in FIG. 10(A) is GPS positional information indicating the place of use, for example, the aggregation unit 21 converts the GPS positional information to a country name, thereby defining the "country name" as a value of attribute. Alternatively, it is allowable to configure such that the aggregation unit 21 defines the accompanying information 41D as an ID to identify the GW 3 and defines an "name of the section" corresponding to the ID as a value of attribute, with reference to an external DB.

The aggregation unit 21 specifies the value of attribute, and thereafter, updates aggregation on the viewpoint-based aggregation table 42 (step S33). In other words, the aggregation unit 21 updates FQDN 42A, the number of accesses 42B for commonality, the number of accesses for attribute 42C, and the sum of them on the viewpoint-based aggregation table 42 illustrated in FIG. 10(B).

The aggregation unit 21 updates the viewpoint-based aggregation table 42, and thereafter, updates the GW-attribute correspondence table 44 that specifies attribute of the GW 3 from the communication history 41, illustrated in FIG. 10(C) (step S34). The aggregation unit 21 determines whether aggregation of the viewpoint-based aggregation table 42 for a aggregation target period has been completed (step S35).

In a case where aggregation of the viewpoint-based aggregation table 42 has been completed (step S35: Yes), the aggregation unit 21 generates the viewpoint-based rank table 43 from the viewpoint-based aggregation table 42 (step S36), and finishes the processing operation in FIG. 9. As illustrated in FIG. 10(D), the aggregation unit 21 calculates the number of accesses 432A (432B) and the percentage 433A (433B) for each of FQDNs 431A (431B), and updates the viewpoint-based rank table 43.

In a case where aggregation of the viewpoint-based aggregation table 42 has not been completed (step S35: No), the aggregation unit 21 moves on to step S32 so as to specify a value for attribute based on the accompanying information.

Figure 11:
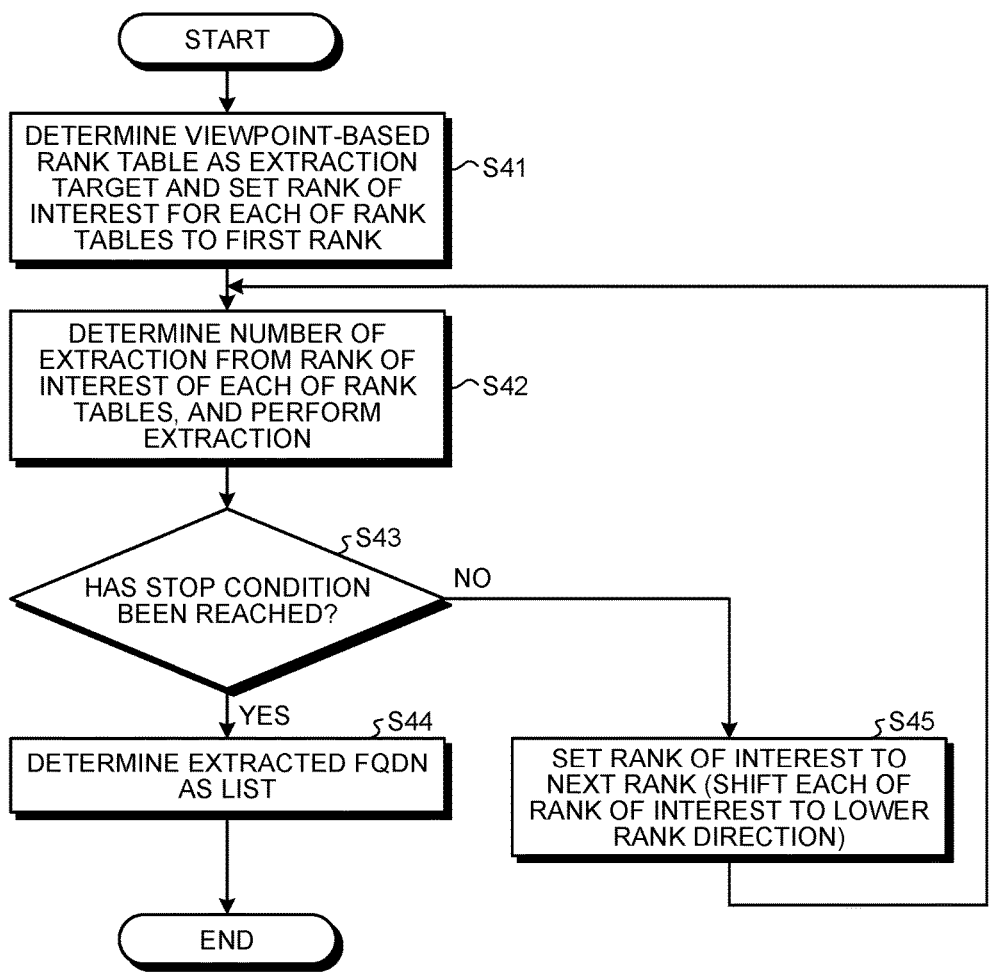
FIG. 11 is a flowchart illustrating exemplary processing operation on the management server side related to extraction processing.

Next, a method for extracting FQDNs from the viewpoint-based rank table 43 using the extraction unit 22 will be described. FIG. 11 is a flowchart illustrating exemplary processing operation on the management server 4 side related to extraction processing. In FIG. 11, the extraction unit 22 determines the viewpoint-based rank table 43 as an extraction target, and sets a rank of interest for the viewpoint-based rank table 43 to a first rank (step S41). Note that to determine the viewpoint-based rank table 43 is to determine the commonality rank table 43A and the attribute rank table 43B as the extraction target.

The extraction unit 22 determines the number of extraction from the attribute rank table 43B and from the commonality rank table 43A as the extraction target for the rank of interest among the viewpoint-based rank table 43, and extracts FQDNs of the number of extraction based on a fixed extraction ratio (step S42). As illustrated in FIG. 6, the extraction unit 22 determines, for example, the rank table 43B for "JP" as an extraction target, and extracts FQDNs highly ranked in the percentage for which the number of extraction is nine, with the extraction ratio of 2:1, from the commonality rank table 43A and from the rank table 43B of "JP". Accordingly, as illustrated in FIG. 6, the extraction unit 22 would extract FQDNs of "1", "2", "15", "6", "15", "16", "3", "16", and "1".

The extraction unit 22 determines whether the extraction stop condition has been reached (step S43). In this case, the extraction stop condition would be, for example, a case where the number of extraction for FQDNs reaches the upper limit of the number of entries for the GW 3, or a case where the load amount on the second NW 7-side server has decreased to reach a target load value.

When the extraction stop condition has been reached (step S43: Yes), the extraction unit 22 determines the extracted FQDNs as a list (step S44), and finishes the processing operation illustrated in FIG. 11. When the extraction stop condition has not been reached (step S43: No), the extraction unit 22 sets the rank of interest to a next rank on the commonality rank table 43A and the attribute rank table 43B (step S45). The extraction unit 22 determines the number of extraction from the viewpoint-based rank table 43 as the extraction target, and moves on to step S42 so as to extract FQDNs of the number of extraction based on a fixed extraction ratio.

According to the communication management system 1 in the first exemplary embodiment, the management server 4 extracts FQDNs highly ranked in the amount of access from the commonality rank table 43A and the attribute rank table 43B, as aggregation targets, with a fixed extraction ratio, and distributes a list including the extracted FQDNs to the corresponding GW 3. As a result, even with the increased number of sites to be used, the communication management system 1 adds FQDNs to the list based on the amount of access for each of FQDNs of the destination site 5 in view of both commonality and attribute. Accordingly, it is possible to achieve balanced processing load on the GW 3 side and the management server 4 side.

The management server 4 collects the communication history 41 for each of GWs 3, generates a viewpoint-based aggregation table 42 that aggregates the number of accesses for each of FQDNs of the destination site 5, and generates the commonality rank table 43A and the attribute rank table 43B based on the viewpoint-based aggregation table 42. Furthermore, the management server 4 extracts FQDNs highly ranked in the amount of access from the commonality rank table 43A and the attribute rank table 43B, and distributes the extracted FQDNs as a list of a corresponding GW 3. As a result, the management server 4 can add FQDNs to the list based on the amount of access for each of the FQDNs of the destination sites 5 in view of both commonality and attribute, and distributes a list with high hit ratio to the corresponding GW 3. This can reduce not only processing load on the NW 7 side but also processing load on the GW 3 side.

The management server 4 extracts the predetermined number of FQDNs highly ranked in the amount of access from each of the commonality rank table 43A and the attribute rank table 43B with a fixed extraction ratio, and thus, can extract FQDNs from the viewpoint-based rank table 43 with a fixed extraction ratio.

Alternatively, in the above-described first exemplary embodiment, it is allowable to extract FQDNs from the commonality rank table 43A and the attribute rank table 43B, with a fixed extraction ratio (commonality rank table: attribute rank table=2:1), and in a case duplicate FQDNs exist in the extracted FQDNs, it is allowable to re-extract FQDNs of the number of duplication.

In the management server 4 in the above-described first exemplary embodiment, FQDNs are extracted from the viewpoint-based rank table 43 with a fixed extraction ratio. Alternatively, however, it is allowable to configure such that the management server 4 inverts the extraction ratio according to the percentages of the number of accesses of FQDNs on the viewpoint-based rank table 43. An embodiment in this case will be described below as a second exemplary embodiment. A same reference sign will be given to a configuration that is same as the configuration of the communication management system 1 in the first exemplary embodiment, and description of the duplicate configuration and operation will be omitted.

[b] Second Exemplary Embodiment

The determination of whether to add an FQDN to the list uses the percentage of the number of accesses of the FQDN. The percentage of the number of accesses of the FQDN indicates the load, namely, a load reduction amount (degree of contribution to load reduction) on the second NW 7-side server in a case where communication is performed via the first NW 6. For example, in some cases, some of the destination sites 5 having a great number of accesses over an entire aggregation target period have a moderate or small number of accesses when a specific GW 3 is a GW of interest. In other cases, some of the destination sites 5 having a moderate or small number of accesses over an entire aggregation target period have a great number of accesses when a specific GW 3 is a GW of interest. Accordingly, the management server 4 extracts FQDNs to be added to the list from both the commonality and the attribute as a separate group, among the total number of accesses, while inverting the extraction ratio based on the above-described percentage.

FIG. 12 is a diagram illustrating an exemplary method of extracting FQDNs in a second exemplary embodiment. The percentage 433A (433B) of each of viewpoint-based rank tables 43X in FIG. 12 indicates the percentage of the number of accesses of each of FQDNs among the total number of accesses, for each of the viewpoints, when the total percentage of the total number of accesses for each of the viewpoints is assumed to be 100%. The percentage 433A (433B) corresponds to a usage rate or a load reduction amount (degree of contribution to reduction) on the second NW 7-side server in a case where the corresponding viewpoint (commonality, JP, or US) is a viewpoint of interest. For example, in a case where FQDN "1" illustrated in FIG. 12 is an FQDN of interest, and in view of commonality (whole), the percentage 433A would be 17.45%. The percentage 433B would be 11.39% in view of "JP". Accordingly, it is possible to define that the percentages 433A and 433B corresponds to the degree of contribution to reduction in a case where the corresponding FQDN has been added to the list, and corresponds to the usage rate of the second NW 7-side server in a case where the corresponding FQDN has not been added to the list.

The percentage 433A (433B) of the amount of access on the viewpoint-based rank table 43X is higher rank lower rank, namely, the value becomes smaller in a lower rank. In some cases on the commonality rank table 43A and the attribute rank table 43B, the magnitude correlation of percentages on the rank of interest of 433A and 433B might be reversed. Since extracting a great number of FQDNs from the rank table with larger percentage 433A or 433B of the number of accesses would be more effective, the extraction unit 22 determines allocation of extraction ratio according to the percentage of the number of accesses (the degree of contribution to reduction). As a result, the extraction unit 22 can extract FQDNs more efficiently than a case where a fixed extraction ratio is used.

Next, a method of extracting FQDNs to be added to the list from the viewpoint-based rank table 43X according to the second exemplary embodiment will be described. The extraction unit 22 sequentially extracts FQDNs of the number of entries, from the FQDNs highly ranked in percentages 433A and 433B from the viewpoint-based rank table 43, with an extraction ratio. First, the extraction unit 22 compares the percentages at the highest ranks with each other based on the commonality rank table 43A and the attribute rank table 43B, and sets the extraction ratio such that a great number of FQDNs are extracted from the rank table with a greater percentage. The extraction unit 22 separately extracts FQDNs with the percentage 433A (433B) from the commonality rank table 43A and from the attribute rank table 43B, with an extraction ratio of 2:1, as illustrated in FIG. 12. Subsequently, the extraction unit 22 extracts FQDNs "1" and "2" from the commonality rank table 43A and FQDN "15" from the attribute rank table 43B, with the extraction ratio of 2:1.

Furthermore, the extraction unit 22 compares the percentages at the highest ranks with each other based on each of the commonality rank table 43A and the attribute rank table 43B. Based on a result of comparison, the extraction unit 22 inverts the extraction ratio, in this case, from 2:1 to 1:2 since reversal has occurred in the magnitude correlation of the degree of contribution to reduction, namely, the percentage of the commonality rank table 43A and the attribute rank table 43B. The extraction unit 22 extracts FQDNs "16" and "1" from the attribute rank table 43B and FQDN "6" from the commonality rank table 43A, with the extraction ratio of 1:2. Accordingly, as illustrated in FIG. 12, the extraction unit 22 would extract FQDNs of "1", "2", "15", "16", "1", "6", "13", "12", and "15". The extraction ratio is set to 2:1 according to the degree of contribution to reduction. The extraction unit 22 determines the extraction ratio of the commonality rank table 43A versus attribute rank table 43B as 2:1 based on the first-ranked access percentage. Moreover, the extraction unit 22 compares the percentage at the highest rank (third rank) on the commonality rank table 43A, with the percentage at the highest rank (second rank) on the attribute rank table 43B, and inverts the extraction ratio so as to extract a great number of FQDNs from the attribute rank table 43B having greater percentage. Accordingly, the extraction unit 22 sets the extraction ratio of the commonality rank table 43A versus attribute rank table to 1:2. With the extraction ratio being set to 1:2. When the number of extracted FQDNs reaches the upper limit of the number of entries for the list, the extraction unit 22 stops FQDN extraction processing. The extraction unit 22, however, stops FQDN extraction processing when the load on the second NW 7-side server decreases to a load target value even when the number of extracted FQDNs has not reached the upper limit of the number of entries. This processing aims to reduce the load needed for the extraction processing on the GW 3 side.

Next, a method for extracting FQDNs from the viewpoint-based rank table 43X using the extraction unit 22 in the second exemplary embodiment will be described. The extraction unit 22 determines the viewpoint-based rank table 43X as an extraction target, and sets a rank of interest for the viewpoint-based rank table 43X to a first rank. The extraction unit 22 determines the number of extraction from the attribute rank table 43B as the extraction target for the rank of interest, and from the commonality rank table 43A, among the viewpoint-based rank table 43X based on a result of comparison of the percentages in the rank of interest (degree of contribution to reduction) on the viewpoint-based rank table 43X, and extracts FQDNs of the number of extraction.

As illustrated in FIG. 12, the extraction unit 22 determines, for example, the rank table 43B of "JP" as an extraction target, and extracts FQDNs highly ranked in percentage for which the number of extraction is nine, with the extraction ratio of 2:1, from the commonality rank table 43A and from the rank table 43B of "JP".

As illustrated in FIG. 12, the extraction unit 22 extracts FQDNs "1" and "2" from the commonality rank table 43A, and extracts FQDN "15" from the rank table 43B for "JP". After extracting FQDNs "1", "2" and "15", the extraction unit 22 compares the percentage of FQDN "6" at the highest rank in percentage on the commonality rank table 43A, with the percentage of FQDN "16" at the highest rank in percentage on the rank table 43B for "JP". Since the percentage of FQDN "16" on the rank table 43B for "JP" is greater, the extraction unit 22 inverts the extraction ratio toward the commonality rank table 43A versus the rank table 43B for "JP" to 1:2, based on the result of comparison.

After extraction ratio inversion, the extraction unit 22 extracts FQDNs "16" and "1" from the rank table 43B for "JP", and extracts FQDN "6" from the commonality rank table 43A. Then, the extraction unit 22 determines whether the extraction stop condition has been reached. When the extraction stop condition has been reached, the extraction unit 22 determines the extracted FQDNs as a list.

When the extraction stop condition has not been reached, the extraction unit 22 sets the rank of interest to a next rank on the commonality rank table 43A and the attribute rank table 43B. The extraction unit 22 determines the number of extraction from the viewpoint-based rank table 43X as extraction target based on a result of comparison of the percentages in the set rank of interest (degree of contribution to reduction) and extracts FQDNs of the number of extraction.

Before extracting a predetermined number of FQDNs, the management server 4 in the second exemplary embodiment compares the percentages corresponding to the rank of interest on the commonality rank table 43A and the attribute rank table 43B, and inverts the extraction ratio such that a great number of FQDNs are extracted from the rank table with a greater percentage. As a result, it is possible to extract a great number of FQDNs from the rank table with higher percentage.

Alternatively, in the above-described second exemplary embodiment, it is allowable to invert the extraction ratio based on a result of comparison of percentages corresponding to the rank of interest, to extract FQDNs with an inverted extraction ratio, and in a case duplicate FQDNs exist in the extracted FQDNs, it is allowable to re-extract FQDNs of the number of duplication.

It would be also allowable that, in the above-described second exemplary embodiment, FQDNs are extracted based on an extraction ratio and that presence/absence of duplicate FQDNs is detected each time FQDN extraction is performed based on the extraction ratio. An embodiment in this case will be described below as a third exemplary embodiment. A same reference sign will be given to a configuration that is same as the configuration in the second exemplary embodiment, and description of the duplicate configuration and operation will be omitted.

[c] Third Exemplary Embodiment

Figure 13:
FIG. 13 is a diagram illustrating an exemplary method of extracting FQDNs in a third exemplary embodiment.

A method for extracting FQDNs from a viewpoint-based rank table 43Y using the extraction unit 22 will be described. FIG. 13 is a diagram illustrating an exemplary method of extracting FQDNs in a third exemplary embodiment.

The management server 4 in the third exemplary embodiment extracts FQDNs highly ranked in percentage, from the commonality rank table 43A and the attribute rank table 43B, for a predetermined number for extraction. In a case where a same FQDN is duplicated among the FQDNs of the predetermined number of extraction, the management server 4 deletes the duplicate FQDN and then extracts an FQDN in the next rank. As a result, the management server 4 can extract FQDNs of the predetermined number of extraction from the both rank tables, while preventing duplicate registration of duplicate FQDN, and maintaining balance in extraction. In FIG. 13, the extraction unit 22 determines the viewpoint-based rank table 43Y as an extraction target, and sets a rank of interest for the viewpoint-based rank table 43Y to a first rank.

The extraction unit 22 determines the number of extraction from the attribute rank table 43B of the extraction target for the rank of interest, and from the commonality rank table 43A, among the viewpoint-based rank table 43Y based on a result of comparison of the percentages in the rank of interest (degree of contribution to reduction) on the viewpoint-based rank table 43Y, and extracts FQDNs of the number of extraction. As illustrated in FIG. 13, the extraction unit 22 determines, for example, the rank table 43B of "JP" as an extraction target, and extracts FQDNs highly ranked in percentage for which the number of extraction is nine, with the extraction ratio of 2:1, from the commonality rank table 43A and from the rank table 43B of "JP". Accordingly, as illustrated in FIG. 13, the extraction unit 22 would extract FQDNs of "1", "2", "3", "6", "12", "13", "14", "15", and "16".

As illustrated in FIG. 13, the extraction unit 22 extracts FQDNs "1" and "2" from the commonality rank table 43A, and extracts FQDN "15" from the rank table 43B for "JP", and then extracts FQDN "16" and "1" and "6" by inverting extraction ratio, as same as second embodiment. In this, however, FQDN "1" extracted from the rank table 43B for "JP" has already been extracted, and thus, the extraction unit 22 deletes the already-extracted FQDN "1", shifts to an FQDN next ranked in percentage, and extracts FQDN "13". After extracting FQDNs "1", "2" and "15", the extraction unit 22 compares the percentage of FQDN "6" at the highest rank in percentage on the commonality rank table 43A, with the percentage of FQDN "16" at the highest rank in percentage on the rank table 43B for "JP". Since the percentage of FQDN "16" on the rank table 43B for "JP" is greater, the extraction unit 22 inverts the extraction ratio for the commonality rank table 43A versus the rank table 43B for "JP" from 2:1 to 1:2, based on a result of comparison.

As illustrated in FIG. 13, in a case where a same FQDN is duplicated among the FQDNs of the number of extraction, the extraction unit 22 deletes one of the duplicate FQDNs from the FQDNs of the number of extraction and shifts. Specifically, after extraction ratio inversion illustrated in FIG. 13, the extraction unit 22 extracts FQDNs "16" and "1" from the rank table 43B for "JP", and extracts FQDN "6" from the commonality rank table 43A.

Then, the extraction unit 22 determines whether the extraction stop condition has been reached. When the extraction stop condition has been reached, the extraction unit 22 determines the extracted FQDNs as a list. When the extraction stop condition has not been reached, the extraction unit 22 sets the rank of interest to a next rank on the commonality rank table 43A and the attribute rank table 43B. The extraction unit 22 determines the number of extraction from the viewpoint-based rank table 43Y as an extraction target based on a result of comparison of percentages in the set rank of interest (degree of contribution to reduction) and extracts FQDNs of the number of extraction.

In a case where the same FQDN is duplicated among the FQDNs of the set number of extraction, the extraction unit 22 in the above-described third exemplary embodiment, as illustrated in FIG. 13, may apply processing of deleting one of the duplicate FQDNs from the FQDNs of the number of extraction and then shifting, to the extraction unit 22 in the first exemplary embodiment. In this case, the extraction unit 22 can avoid duplicate extraction of the same FQDN.

Figure 14A:
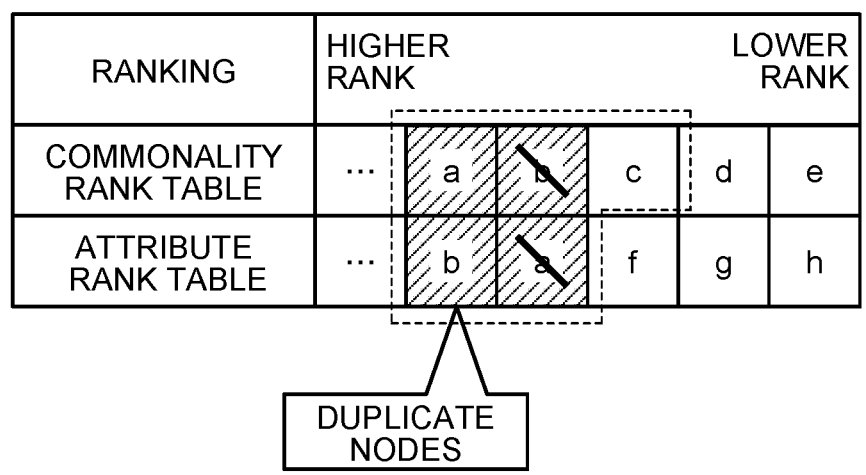
FIGS. 14A and 14B are diagrams illustrating an exemplary case of preventing duplicate extraction of FQDN.
Figure 14B:
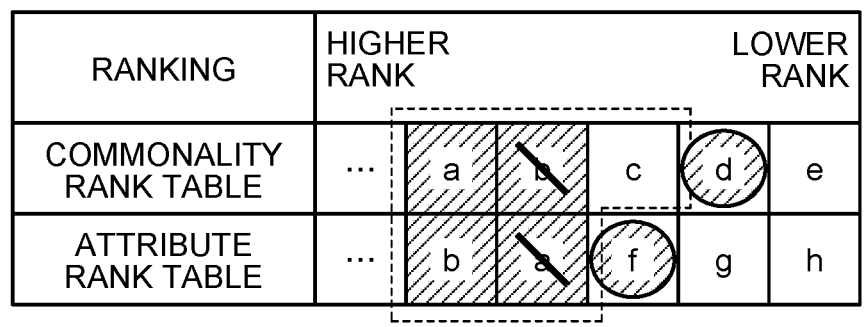

Next, a method of preventing duplicate extraction of the same FQDN at the time of extraction of FQDNs by the extraction unit 22 in the above-described first to third exemplary embodiments will be described. FIGS. 14A to 14B are diagrams illustrating an exemplary case of preventing duplicate extraction of FQDN.

A same FQDN is duplicated among FQDNs as extraction targets on the viewpoint-based rank table 43Y, the extraction unit 22 prevents duplicate extraction of the same FQDN. FIG. 14A illustrates the extraction ratio of the commonality rank table 43A and the attribute rank table 43B is 3:2, and the five FQDNs extracted, namely, "a","b","c" for 43A and "b","a" for 43B. Among the extracted FQDNs, "a" and "b" are duplicated.

To handle this, there would be a method to delete FQDN "a" from the commonality rank table 43A, and delete FQDN "b" from the attribute rank table 43B, as illustrated in FIG. 14A. This method, however, would decrease the number of extraction from five to three, disturbing the balance in the extraction ratio (3:2). To cope with this, the extraction unit 22 alternately shifts on the commonality rank table 43A and the attribute rank table 43B to delete the duplicate FQDN. For example, as illustrated in FIG. 14B, the duplicate FQDN "b" is deleted from the commonality rank table 43A, and the next-ranked FQDN "d" is extracted. Subsequently, the extraction unit 22 deletes the duplicate FQDN "a" from the attribute rank table 43B, and extracts the next-ranked FQDN "f". That is to say, the extraction unit 22 extracts FQDNs "a", "c", and "d" from the commonality rank table 43A, and together with this, extracts FQDNs "b" and "f" from the attribute rank table 43B. In this manner, the extraction unit 22, while avoiding duplicate extraction of the same FQDN, maintains the number of extraction of five and the extraction ratio of 3:2.

Figure 15:
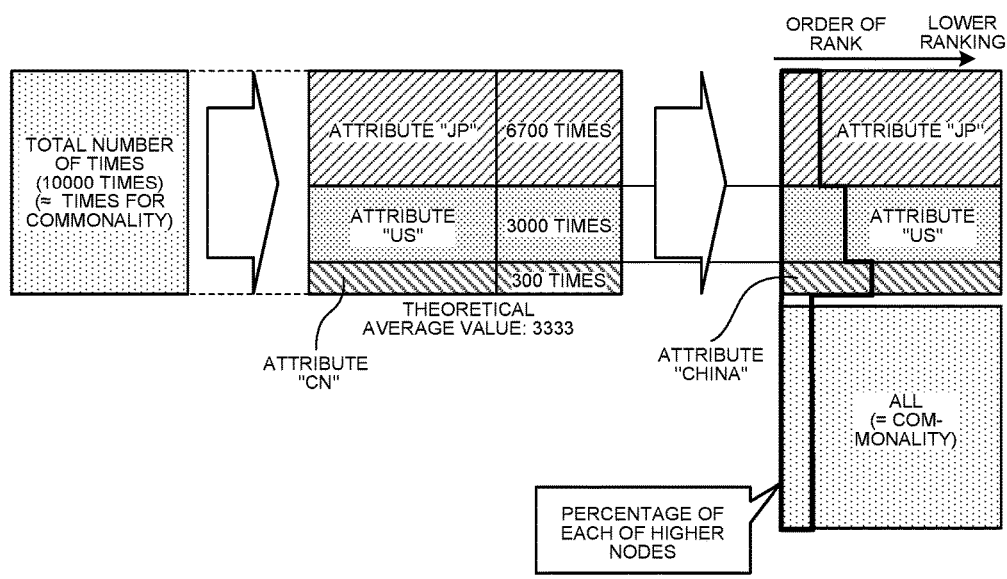
FIG. 15 is a diagram illustrating an exemplary method of correcting percentages on a attribute rank table.

Meanwhile, in a case where aggregation is performed by classifying the whole number of accesses on the communication history 41 as aggregation targets based on attribute, there might be a great difference in the total number of accesses for each of attribute. When a specific attribute has a small total number of accesses among the total numbers of accesses in plurality types of attribute, an influence of one access to the percentage 433B would be increased. To cope with this situation, a method to correct the percentage 433B on the attribute rank table 43B will be described. FIG. 15 is a diagram illustrating an exemplary method of correcting the percentage 433B on the attribute rank table 43B. FIG. 16 is a diagram illustrating an exemplary correction of percentage 433B in each of rank tables 43B.

For example, it is assumed that the whole number of accesses as aggregation target is 10000, the total number of accesses for attribute "JP" is 6700, the total number of accesses for attribute "US" is 3000, and the total number of accesses for attribute "China" is 300. At this time, there is a great difference among total numbers of accesses for individual attribute, and the magnitude correlation of influence of one access toward the percentage of FQDN would be attribute "JP"<attribute "US" <attribute "China". For example, in extracting FQDNs from the commonality rank table 43A and the rank table 43B for attribute "China", the extraction unit 22 performs downward adjustment on the percentage 433B of each of FQDNs for attribute "China", as illustrated in FIG. 16, because the total number of accesses for attribute "China" is small. Accordingly, the number of FQDNs extracted from the rank table 43B for attribute "China" would be small.

In contrast, in extracting FQDNs from the commonality rank table 43A and the rank table 43B for attribute "JP", upward adjustment is performed on the percentage 433B of each of FQDNs for attribute "JP", as illustrated in FIG. 16, because the total number of accesses for attribute "JP" is great. Accordingly, the number of FQDNs extracted from the rank table 43B for attribute "JP" would be great.

Figures 17A, 17B:
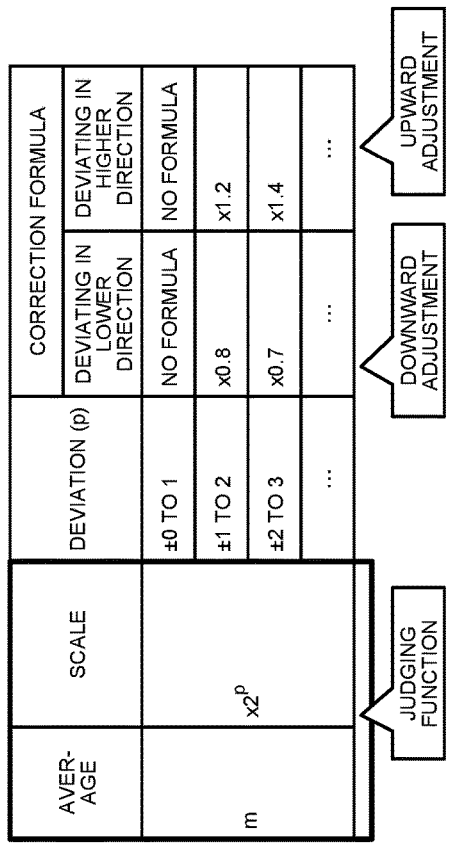
FIGS. 17A and 17B are diagrams illustrating an exemplary method of correcting percentages on a attribute rank table.

Next, a method of correction the percentage 433B will be described in detail. FIGS. 17A and 17B are diagrams illustrating an exemplary method of correcting the percentage 433B on the attribute rank table 43B. As illustrated in FIGS. 17A and 17B, there is a case where a deviation range of the number of accesses for attribute becomes great compared with a theoretical average value obtained from the whole number of accesses as aggregation targets and from the total number of accesses for each of the attribute. For example, in a case where the total number of accesses is 10000, the maximum deviation range in the total number ratio among the three items of attribute is 9998:1:1. Accordingly, a concept of "scale" is to be used as a judging function employed at level classification of the number of accesses for each of attribute. Specifically, a correction formula is to be applied to the percentage of each of FQDNs. The correction formula corresponds to deviation in the number of accesses when the number of accesses for each of the attribute items is classified at the level by a linear function or an exponential function.

In FIG. 17A, the scale is a mathematical expression for level classification of deviation between the number of accesses N and an average value m. The average value m is a theoretical average number of times obtained from the total number on the communication history 41 as an aggregation target and from the number of attribute rank tables 43B. When the scale is expressed by using "×$2^P$" (exponentiation), the equation would be: $f=m×2^P$. Alternatively, it is allowable to set the scale to "+1000×p", namely, f=m+1000×p, or the like, and to set the correction formula to an addition/subtraction equation ±10%.

In FIG. 17B, for example, in a case the average value m is 10000 using judging function $f=m×2^P$, the correction formula according to the total number of accesses for each of the attribute rank tables 43B would be as illustrated in FIG. 17B. In a case where the total number X on the attribute rank table 43B is, for example, 2500≤X<5000, the extraction unit 22 performs downward adjustment at FQDN percentage of 0.8 times. In a case where the total number X on the attribute rank table 43B is, for example, 20000≤X<40000, the extraction unit 22 performs upward adjustment at FQDN percentage of 1.2 times. In a case where the percentage on the attribute rank table 43B exceeds a range of 0 to 100, the extraction unit 22 sets the value to 0% or 100%.

The aggregation unit 21 aggregates the viewpoint-based rank table 43 (43X and 43Y), and thereafter, determines whether the viewpoint-based rank table 43 needs correction. When the viewpoint-based rank table 43 needs correction, the aggregation unit 21 executes correction processing illustrated in FIGS. 17A and 17B on the attribute rank table 43B. With this correction processing, the percentage 433B is corrected according to the deviation between the total number of accesses and the theoretical average value.

As described above, In a case where the total number of accesses of each of the attribute rank tables 43B on the viewpoint-based rank table 43 deviates from the theoretical average number of times in a decreasing direction or an increasing direction, the management server 4 adjusts the percentage of each of FQDNs on the attribute rank table 43B in the corresponding direction. As a result, the management server 4 adjusts the degree of influence of the attribute relative to the whole, thereby achieving alleviation of the influence of the difference in the number of accesses (difference in parameters) between the rank tables when conversion is performed in terms of percentage.

When the total number of accesses of each of the attribute rank tables 43B on the viewpoint-based rank table 43 deviates from the theoretical average number of times in an increasing direction, the management server 4 corrects the percentage of each of FQDNs on the attribute rank table 43B in the increasing direction. As a result, the management server 4 increases the degree of influence of the attribute relative to the whole, thereby achieving alleviation of the influence of the difference in the number of accesses (difference in parameters) between the rank tables when conversion is performed in terms of percentage.

The above-described exemplary embodiments illustrate, for example, the place of use and the section name, of the GW 3, as accompanying information. The accompanying information, however, is not limited to this but may be information that can group the GW 3.

The above-described exemplary embodiments exemplify the number of accesses as the amount of access. The access amount is not limited to this but may be, for example, the amount of data needed for communication between the GW 3 and the destination site 5.

In the above-described exemplary embodiments, FQDNs highly ranked in the percentage of the number of accesses are extracted as a list, from the attribute rank tables 43B, namely, for each of countries, and the commonality rank table 43A, using, for example, accompanying information of the place of use for each of the countries. Alternatively, it is allowable to extract FQDNs highly ranked in the percentage from the attribute rank tables 43B for individual countries, the attribute rank tables 43B for the section name, and the commonality rank table 43A, as a list, using two or more types of accompanying information such as the place of use for each of the countries, and the section name. In this case, the extraction ratio for a commonality rank table X, a rank table Y for the place of use, and a rank table Z for the section name may be set to X:Y:Z.

The extraction unit 22 in the above-described exemplary embodiments extracts FQDNs highly ranked in the percentage with the variable extraction ratio, from the commonality rank table 43A and from the attribute rank table 43B as aggregation target, as a list. Alternatively, it is allowable to configure such that the extraction unit 22 extracts FQDN highly ranked in percentage, with a fixed extraction ratio, from the commonality rank table 43A and from the attribute rank table 43B as aggregation target, as a list.

The illustrated components in each of portions need not be physically configured as illustrated. That is, specific forms of distribution and integration for each of portions are not limited to the illustrated forms, but all or part of the portions may be configured to be physically or functionally distributed or integrated in an arbitrary unit, according to various loads and condition of use.

Furthermore, it is allowable to configure such that all or part of various processing functions executed on each of apparatuses are executed on a central processing unit (CPU) or on a microcomputer such as a micro processing unit (MPU) and a micro controller unit (MCU). In addition, various processing functions may be understandably arranged such that all or part of them can be performed on a program analyzed and run on CPU (or on other microcomputers such as MPU and MCU), or on hardware using a wired logic circuit.

Figure 18:
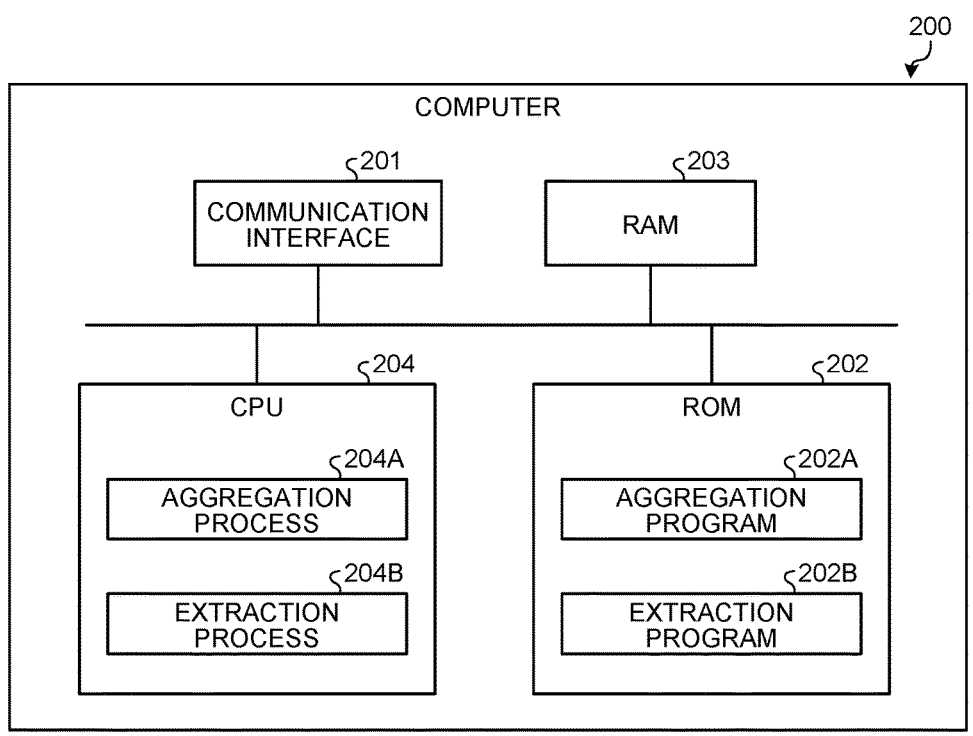
FIG. 18 is a diagram illustrating an exemplary computer that executes a communication management program.

Meanwhile, various processing described in the present exemplary embodiments may be implemented by incorporating a prepared program onto a computer. Thus, the following will describe an exemplary computer for executing a program having similar function as in the above-described exemplary embodiments. FIG. 18 is a diagram illustrating an exemplary computer that executes a communication management program.

In FIG. 18, a computer 200 that executes a communication management program includes a communication interface 201, a ROM 202, a RAM 203, and a CPU 204.

The ROM 202 prestores a communication management program that has a same function as the functions of the above-described exemplary embodiments. The communication management program may be stored not only in the ROM 202 but also in a storage medium that can be read by a drive (not illustrated) Exemplary storage media includes a portable recording media such as a CD-ROM, a DVD disk, a USB memory, and an SD card, or a semiconductor memory such as a flash memory. It is also allowable to configure such that the communication management program is obtained from a storage device communicative via a network. As illustrated in FIG. 18, the communication management program includes an aggregation program 202A and an extraction program 202B. Each of the programs 202A and 202B can be integrated or distributed as appropriate.

The CPU 204 reads the programs 202A and 202B from the ROM 202, and executes each of the programs that have been read. The CPU 204 functions as an aggregation process 204A and an extraction process 204B.

In a case where a communication destination party included in a communication request exists on a list, the relay apparatus relays communication with the communication destination party using a specific route. Along with this, the CPU 204 obtains a communication history including the communication destination party in the communication with the relay apparatus, and identification information and attribute of the relay apparatus. Furthermore, the CPU 204 aggregates the amount of access for each of the communication destination parties based on the obtained communication history, and generates an attribute-based rank table on an attribute of interest and a commonality rank table related to all the relay apparatuses. Furthermore, the CPU 204 extracts a predetermined number of communication destination parties highly ranked in the amount of access from each of the commonality rank table and the attribute-based rank table, as a list of relay apparatuses corresponding to the attribute of interest, based on a predetermined extraction ratio indicating percentage of extracting communication destination parties from each of the commonality rank table and the attribute-based rank table on the attribute of interest. Subsequently, the CPU 204 extracts the communication destination parties onto a list and distributes the list to a relay apparatus corresponding to the attribute of interest. With this configuration, the CPU 204 can achieve balanced processing load on the relay apparatus side or on the computer side, even with the increased number of sites to be used.

To achieve balancing of processing load on a relay apparatus and a management apparatus.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication management system comprising:
a relay apparatus configured to relay communication with a communication destination party via a specific route in a case where the communication destination party included in a communication request exists on a list; and
a management apparatus configured to supply the list to the relay apparatus,
wherein the management apparatus includes
an aggregation unit configured to obtain a communication history including the communication destination party in the communication, identification information and an attribute of the relay apparatus, aggregate the amount of access for each of the communication destination parties based on the obtained communication history, and generate an attribute-based rank table on the attribute of interest and a communication rank table related to all the relay apparatuses, and
an extraction unit configured to extract, based on a predetermined extraction ratio indicating a number of extracting the communication destination parties from each of the communication rank table and the attribute-based rank table on the attribute of interest, a predetermined number of communication destination parties highly ranked in the amount of access from each of the communication rank table and the attribute-based rank table, as the list for the relay apparatuses corresponding to the attribute of interest, and supply the list to the relay apparatus.

2. The communication management system according to claim 1,
wherein, before extracting the predetermined number of communication destination parties, the extraction unit compares a percentage of the communication destination parties on the communication rank table with a percentage of the communication destination parties on the attribute-based rank table, and inverts the extraction ratio so as to extract a great number of communication destination parties from the rank table having a greater percentage.

3. The communication management system according to claim 1,
wherein, in a case where a duplicate communication destination party exists within a predetermined number of communication destination parties when communication destination parties highly ranked in the amount of access are extracted from the communication rank table and the attribute-based rank table in a unit of the predetermined number, the extraction unit extracts a next-ranked communication destination party excluding the duplicate communication destination party.

4. The communication management system according to claim 3,
wherein, in a case where a duplicate communication destination party exists within the predetermined number of communication destination parties, the extraction unit extracts a next-ranked communication destination party on the rank table, excluding the duplicate communication destination party, alternately from one of the communication rank table and the attribute-based rank table.

5. The communication management system according to claim 1,
wherein, in a case where the total amount of access on the attribute-based rank table deviates from an average amount obtained from the total amount of access and the total number of attributes of all the relay apparatuses, the extraction unit corrects, in a direction of deviation, a percentage of each of the communication destination parties on the attribute-based rank table.

6. A management apparatus comprising:
an aggregation unit configured to obtain a communication history including a communication destination party of communication for a relay apparatus that relays communication with the communication destination party via a specific route in a case where the communication destination party included in a communication request exists on a list, identification information and an attribute of the relay apparatus, aggregate the amount of access for each of the communication destination parties based on the obtained communication history, and generate an attribute-based rank table on the attribute of interest and a communication rank table related to all the relay apparatuses, and
an extraction unit configured to extract, based on a predetermined extraction ratio indicating a number of extracting the communication destination parties from each of the communication rank table and the attribute-based rank table on the attribute of interest, a predetermined number of communication destination parties highly ranked in the amount of access, from each of the communication rank table and the attribute-based rank table, as the list for the relay apparatuses corresponding to the attribute of interest, and supply the list to the relay apparatus.

7. A communication management method causing a management apparatus to execute a process comprising:
obtaining a communication history including a communication destination party of communication for a relay apparatus that relays communication with the communication destination party via a specific route in a case where the communication destination party included in a communication request exists on a list, identification information and an attribute of the relay apparatus,
aggregating the amount of access for each of the communication destination parties based on the obtained communication history, generating an attribute-based rank table on the attribute of interest and a communication rank table related to all the relay apparatuses, and
based on a predetermined extraction ratio indicating a number of extracting the communication destination parties from each of the communication rank table and the attribute-based rank table on the attribute of interest,
extracting a predetermined number of communication destination parties highly ranked in the amount of access, from each of the communication rank table and the attribute-based rank table, as the list for the relay apparatuses corresponding to the attribute of interest and supplying the list to the relay apparatus.

* * * * *